United States Patent
Schlecht et al.

(10) Patent No.: US 6,536,829 B2
(45) Date of Patent: Mar. 25, 2003

(54) VEHICLE WITH A PROTECTIVE SUN SHADE IN THE ROOF

(75) Inventors: Werner P. Schlecht, Vaihingen/Enz (DE); Herbert Walter, Ebersbach (DE)

(73) Assignee: Bos GmbH & Co. KG (DE)

( * ) Notice: Subject to any disclaimer, the term of this patent is extended or adjusted under 35 U.S.C. 154(b) by 0 days.

(21) Appl. No.: 09/916,425

(22) Filed: Jul. 27, 2001

(65) Prior Publication Data

US 2002/0033616 A1 Mar. 21, 2002

(30) Foreign Application Priority Data

Aug. 16, 2000 (DE) .......................... 100 40 624

(51) Int. Cl.⁷ .................................................. B60J 3/00
(52) U.S. Cl. .................... 296/97.4; 296/97.8; 296/140; 160/370.22; 160/370.21
(58) Field of Search .................. 296/138, 140, 296/141, 143, 97.8, 97.4, 97.7, 97.9, 214; 160/370.21, 370.22, DIG. 3

(56) References Cited

U.S. PATENT DOCUMENTS

| | | | | |
|---|---|---|---|---|
| 4,363,513 A | * | 12/1982 | Sahar | 296/140 |
| 4,762,358 A | * | 8/1988 | Levosky et al. | 160/370.22 |
| 4,869,542 A | * | 9/1989 | Lin | 160/370.22 |
| 4,929,014 A | * | 5/1990 | Clark et al. | 160/370.21 |
| 5,031,952 A | * | 7/1991 | Miyamoto et al. | 296/97.11 |
| 5,201,563 A | * | 4/1993 | Liao | 296/140 |
| 5,211,439 A | * | 5/1993 | Smith et al. | 296/97.8 |
| 5,292,168 A | * | 3/1994 | Mykytiuk et al. | 296/97.8 |
| 5,404,926 A | * | 4/1995 | Ojima et al. | 160/370.21 |
| 5,409,284 A | * | 4/1995 | Mahler | 160/370.22 |
| 5,418,644 A | * | 5/1995 | Tsai | 296/97.4 |
| 5,443,300 A | * | 8/1995 | Mohammed | 296/97.8 |
| 5,551,744 A | * | 9/1996 | Liao | 160/370.22 |
| 5,562,144 A | * | 10/1996 | Ming-Shun | 160/370.22 |
| 5,645,119 A | * | 7/1997 | Caruso | 160/370.21 |
| 5,653,278 A | * | 8/1997 | Cheng | 160/370.22 |
| 5,791,721 A | * | 8/1998 | Lin | 160/370.22 |
| 5,896,910 A | * | 4/1999 | Chen | 160/370.22 |
| 5,947,544 A | * | 9/1999 | Hubeshi | 296/97.4 |
| 6,086,133 A | * | 7/2000 | Alonso | 296/141 |
| 6,170,553 B1 | * | 1/2001 | Villarreal-Chavez | 160/370.22 |
| 6,322,032 B1 | * | 11/2001 | Su | 160/370.22 |
| 2001/0023747 A1 | * | 9/2001 | Haid et al. | 160/370.21 |
| 2002/0059989 A1 | * | 5/2002 | Schlecht et al. | 160/370.22 |
| 2002/0060469 A1 | * | 5/2002 | Schlecht et al. | 296/97.4 |

FOREIGN PATENT DOCUMENTS

| | | |
|---|---|---|
| DE | 28 15 821 A1 | 10/1978 |
| DE | 41 29 689 A | 3/1993 |
| DE | 196 19 474 A | 11/1997 |
| JP | 2 200518 | * 8/1990 |
| JP | 2 208120 | * 8/1990 |
| WO | WO 97/10963 A | 3/1997 |

* cited by examiner

*Primary Examiner*—Kiran Patel
(74) *Attorney, Agent, or Firm*—Leydig, Voit & Mayer, Ltd.

(57) ABSTRACT

A motor vehicle is equipped with a protective sun shade (13), whose essential mechanical elements are housed in a roof interior space (6), above the headliner (5). The protective sun shade (13) is free of guide rails. Either the sun shade web (14) is sufficiently rigid, or its front edge is supported with the aid of guided guide and push rods (42), (43) in such a way that its front or lower edge (21) is held in contact with the respective pane (8). A gear motor (25) is provided for operating, i.e. retracting and extending the window shade web (14).

30 Claims, 7 Drawing Sheets

VEHICLE WITH A PROTECTIVE SUN SHADE IN THE ROOF

FIELD OF THE INVENTION

The invention relates to window shades for automotive vehicle windows.

BACKGROUND OF THE INVENTION

A window shade as replacement for a tiltable sun visor on windshields is known from DE 28 15 821 A1. A windup roller, which is rotatably seated in the roof ahead of the steel sliding roof is a part of the window shade, on which an edge of a window shade web is fastened. The width of the window shade web corresponds to the width of the customary tiltable sun visors, i.e. the width is less than the width of the windshield.

The window shade web is provided with a stiffening rod on its edge remote from windup roller. Contact pads and handles also are provided on the stiffening rod for supporting the front edge of the window shade web on the inside of the window and for moving the window shade web.

A spring strap, which is rigidly connected with one end of the stiffening rod, is provided for maintaining the window shade web in its pull-out position and also for pressing the front edge against the window. The spring strap runs through a slit in the front edge of the roof, through which the window shade web also exits, and is retracted into the roof interior. There, the spring strap is guided into two stationary positions, which are distanced from each other. Guidance is provided with the aid of elongated holes in the spring strap and corresponding bolts or pins anchored in the roof.

For extracting such sun visor, the user must grasp the handles on the stiffening rod and pull the window shade web out to the desired height. Because of the friction of the spring strap in the guides, it is braked by friction in the position selected by the user, so that the spring provided in the windup roller, which acts in the direction of rolling the window shade web up, does not initially retract the window shade web into the roof.

For retracting the sun visor, the user must push the spring strap back into the roof with the aid of the handles on the stiffening rod, wherein the spring of the windup roller simultaneously causes the windup roller to rotate in the direction of winding the window shade web up.

OBJECTS AND SUMMARY OF THE INVENTION

Based on the foregoing, it is the object of the invention to produce a vehicle with a protective sun shade or window shade, which can be remote-controlled, and whose essential parts are housed in the roof, or to provide a protective sun shade or window shade, which can be remotely controlled and is arranged for the greater part in the roof of a motor vehicle.

Generally, the roof of motor vehicles consists of an outer roof skin, which is a component of the unfinished body, and the headliner, by means of which the stiffening structures of the body in the area of the roof are visually concealed. With the novel window shade, this roof interior is used for housing all essential mechanical parts of the window shade. In particular, a mechanical drive is provided there which makes it possible to extend and retract the window shade by remote control. For example, in this way the driver can operate a window shade which he cannot reach.

A significant advantage of the novel arrangement is that the outlet slit for the window shade is located in the upper part of the vehicle so that there is no danger that any objects of the device could accidentally fall through the slit. Such danger does exist in vehicles with protective window shades or rear window shades which have been installed in the rear window shelf or under it. In that case, the outlet slit opens toward the top so that objects can easily fall through the slit. Moreover, with the protective window shade in accordance with the invention, a cover rail for the outlet slit is not necessarily required.

Because the lower edge of the shade or the front edge which is in the lead when it exits, comes from above, a particularly good shading effect is achieved in the vehicle. Because the bothersome sun beams come from above, the shading effect is most efficient when it is possible to shade the upper portion of the window. The lower portion of the window can remain open, which improves the view through the respective window in comparison with a window shade which comes from below and must always be completely extended, even if shading is only required in the upper window area.

With the window shade arrangement of the invention, the roof of the vehicle is dimensionally stable. It can be an integral part of the unfinished body, but can also be a hardtop that can be removed from the lower portion of the body. Because of being housed in the top, the window shade solution is particularly suited for sporty vehicles with hardtops.

The window, which can be shaded by means of the protective window shade in accordance with the invention, is preferably a rear window, because a large amount of light which leads to strong heating reaches the passenger compartment even when the sun is at an acute angle. With the novel solution, the rear window pane need not necessarily be rigidly and solidly connected with the roof. For example, it can also be a rear window located in a tailgate of a station wagon or all-terrain vehicle. Other windows with which the novel protective window shade can be employed are the front windshield in replacement of a conventional tiltable sun visor, and side windows, which are stationary, as well as side windows on side doors.

The window shade web can be made of a material which inherently is sufficiently stiff for pushing, or alternatively, of a comparatively thin foil that can, be rolled up with a small radius. A window shade web, inherently sufficiently stiff for pushing, offers the advantage that it requires neither pushing members visible from the outside, nor a windup roller, but can be housed in the roof interior in the stretched out state. With a slight curvature of the roof in a direction transverse to the window shade web, a windup roller on which the window shade web is to be wound is suitable. In that case, little space is required in the roof in the movement direction of the window shade web.

Another variation, which is useable with a roof having a significant curvature is a window shade web provided with pulling means at the rear edge, i.e. the edge which always remains in the roof, and which are separately wound on windup disks spaced apart from each other. The solution with windup disks can also be used in case a straight windup roller of sufficient width could not be housed in the roof interior because of the significant curvature of the headliner. Finally, the window shade web may be folded with an accordion fold and housed in a box or component.

Sagging of a soft and thin window shade web also can be prevented if the window shade web is stiffened over its width by means of hoops.

Since modern vehicle body shapes customarily have a considerable taper in the roof area, the windows are unavoidably narrower in the vicinity of the roof edge than in the area of the lower edge. To achieve a maximum shading effect, the pattern of the window shade web is preferably rectangular and of a width corresponding to the narrowest width of the window.

The windup roller, or the windup disks, of the protective window shades can be prestressed in the winding direction by means of a spring drive, or can be driven with the aid of the electric motor.

To move the front edge of window shade webs which are not inherently sufficiently stiff to be pushed, at least one pushing member can be provided, which acts on the front edge. The pushing member has sufficient flexural strength, at least in the area in which it is pushed forward out of the outlet slit, to support the window shade web without guide rails. The pushing member is either driven by the electric motor or by a spring acting in the outlet direction when the windup roller, or the windup disks, are being electrically driven.

Other objects and advantages of the invention will become apparent upon reading the following detailed description and upon reference to the drawings, in which:

Figure 1:
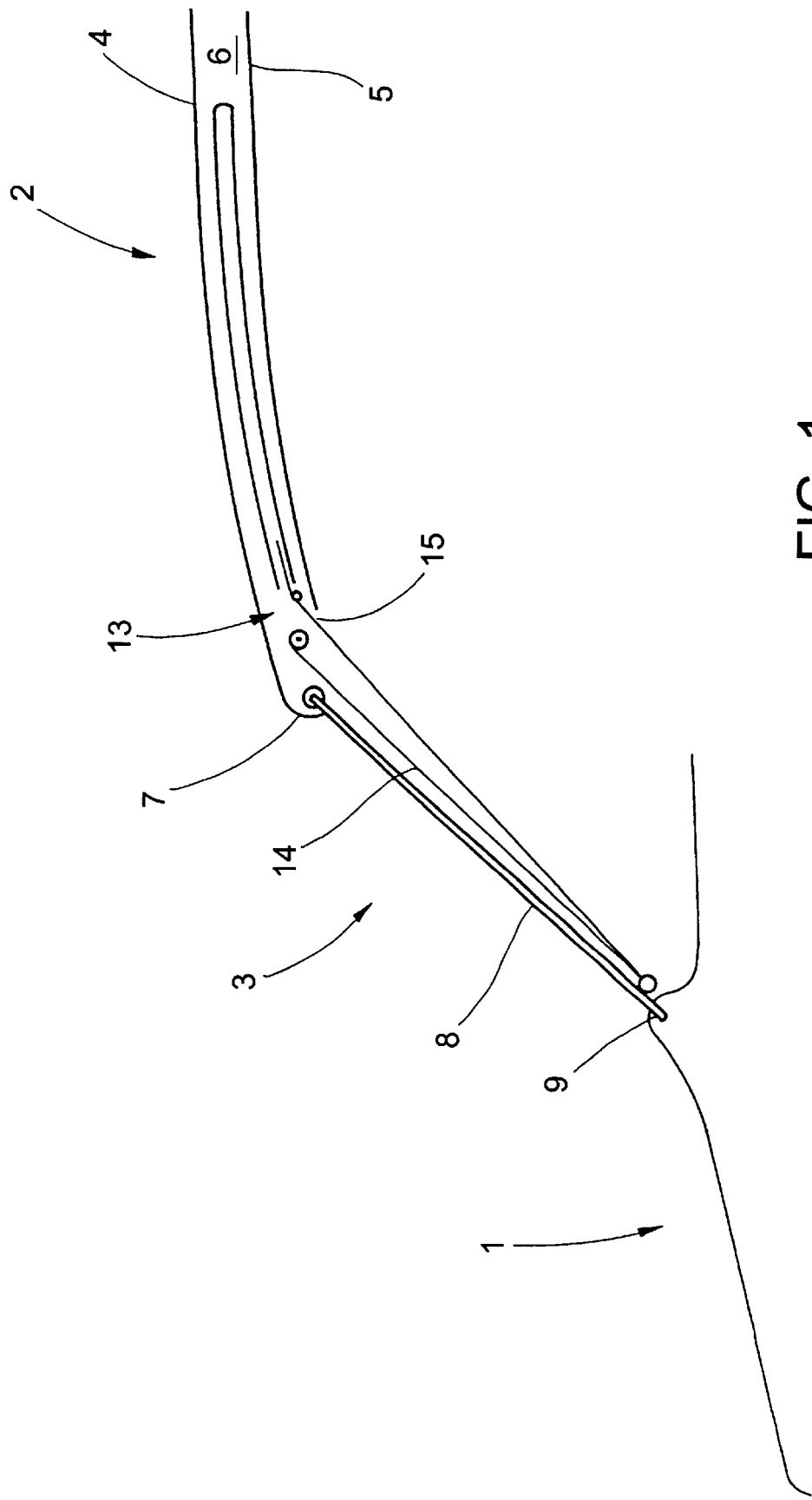
FIG. 1 is a partially diagrammatic, fragmentary longitudinal section of a motor vehicle having a window shade in accordance with the invention installed in the roof, and being illustrated in an extended state.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to FIG. 1 of the drawings, there is shown an illustrative passenger car having a body 1 with a roof 2 and rear window 3. The vehicle roof 2 is comprised of an outer sheet metal skin 4 of the vehicle body and a headliner 5 fastened to the inside of the sheet metal skin. A roof interior space 6, which extends to the rear edge of the roof, or to the upper window edge 7, is defined between the sheet metal skin 4 and the headliner 5. A rear window pane 8 is attached to the rear edge of the roof by means of a weatherstrip or other conventional means and extends as far as the lower window apron wall where it is fastened.

Figure 2:
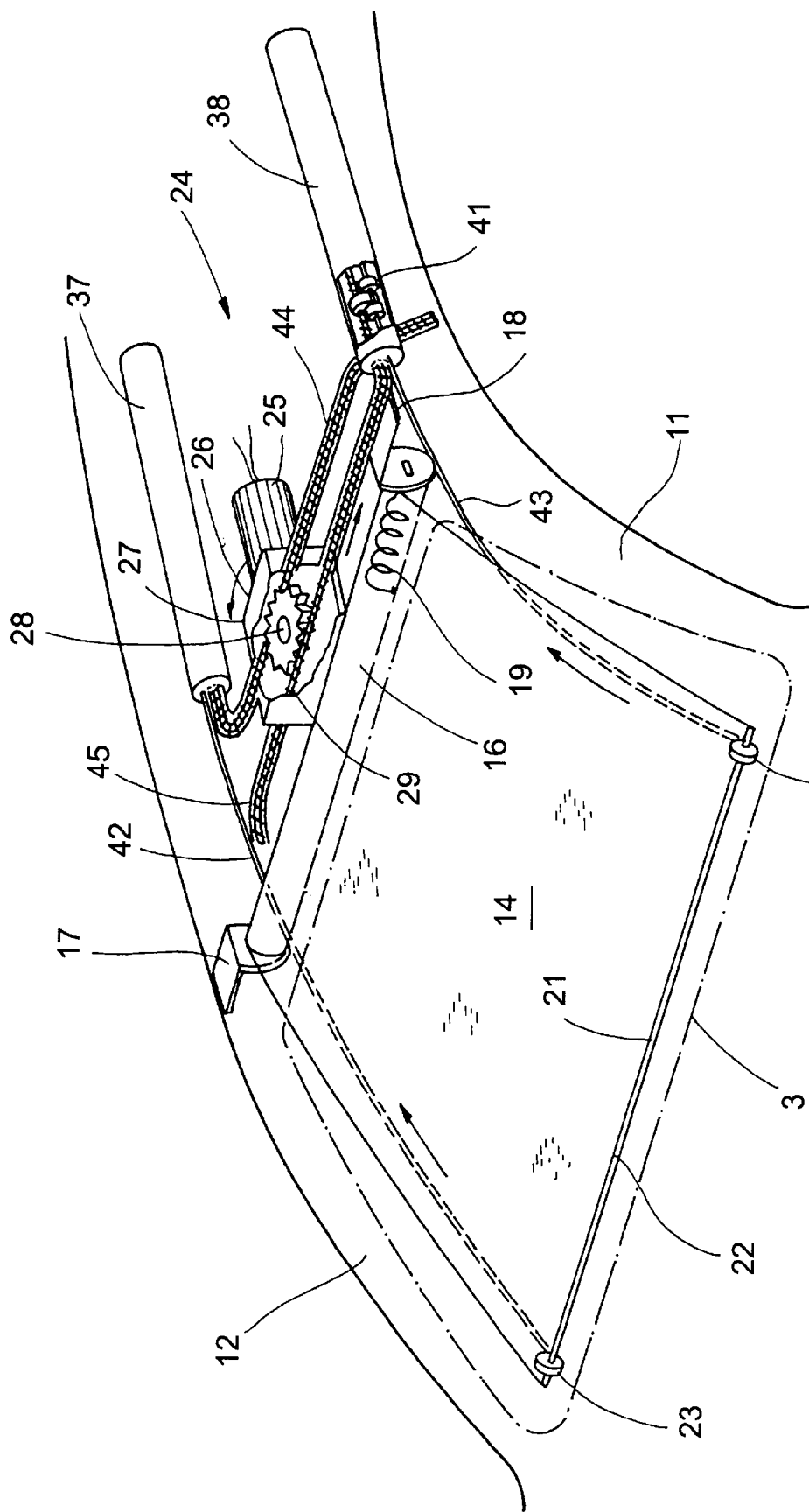
FIG. 2 is a perspective of the window shade and vehicle shown in FIG. 1, with an outer metal skin of the vehicle body removed for purposes of illustrating the interior window shade drive system.

The illustrated rear window 3 is bordered by two C-pillars 11, 12 on opposite sides thereof as depicted in FIG. 2. Side windows, not further represented, adjoin the two C-pillars 11, 12. It will be understood by one skilled in the art that appropriate transverse supports may interconnect the C-shaped pillars for added structural rigidity.

A window shade 13 is housed inside the roof interior space 6, having a window shade web 14 as represented in solid lines in FIG. 1. The window shade web 14 is extendible out through a window shade slit 15 formed in the headliner 5. To this end, the headliner 5 is preferably designed as an inherently dimensionally stable element so that it does not sag in the area of the window shade slit 15. Alternatively, the window shade slit 15 may be bordered by two edges, one of which is part of the headliner 5, while the other is a panel independently anchored on the body in adjoining relation to the rear window pane 8.

To stow the window shade web 14 of the window shade 13 in the roof interior 6 when it is not in use, a windup roller 16 is provided, which extends transversely with respect to the longitudinal direction of the vehicle, and therefore essentially parallel with the upper window edge 7 of the rear window 3. The windup roller is rotatably supported along a horizontal axis in the roof interior by means of two seating flanges 17, 18. The seating flanges 17, 18 are appropriately fastened, for example, to the underside of the sheet metal skin 4.

The windup roller 16 consists of a tube which houses a helical spring 19, one end of which is fixedly connected with the windup roller 16 and the other end is anchored on the seating flange 18. The helical spring 19 is used as a spring drive for prestressing the windup roller 16 in a direction of rotation corresponding to the windup direction of the window shade web 14.

One edge of the window shade web 14, which may be made of a thin foil, is fastened on the windup roller 16. The window shade web 14 has a rectangular shape of a width corresponding to the length of the window shade slit 15, or corresponding to the width of the upper window edge 7 of the rear window 3. The material of the window shade web 14 is either opaque, or is inherently transparent, for reducing the amount of light penetrating thereto. In the case of an essentially opaque material, the foil is provided with a multitude of fine, evenly distributed holes.

The window shade web 14 forms an edge 21, which is remote from the windup roller 16 and, because of the rectangular shape, extends parallel with respect to the windup roller 16. A stiffening rod 22, which extends over the entire width, is attached to the edge 21. In the vicinity of its ends, the stiffening rod 22 has sliders 23, which may be in the form of rollers, in order to guide movement without scratching the inside of the rear window pane 8 and without the danger of damaging heating wires customarily applied to the inside of the rear window pane 8.

A mechanically-operated drive system 24 is provided for the remote-controlled extension and retraction of the window shade web 14, which is also located in the roof interior space and includes the helical spring 19. The drive system 24 further comprises a gear motor 25 with an appropriate d.c. motor and a gear 26 drive. The gear motor 25 is connected with the electric system of the motor vehicle by means of a known electrical control device which can be, selectively actuated by the user. The gear drive 26 has a housing 27, in which a gear output shaft 28 is rotatably seated and carries a gear wheel 29.

Figure 3:
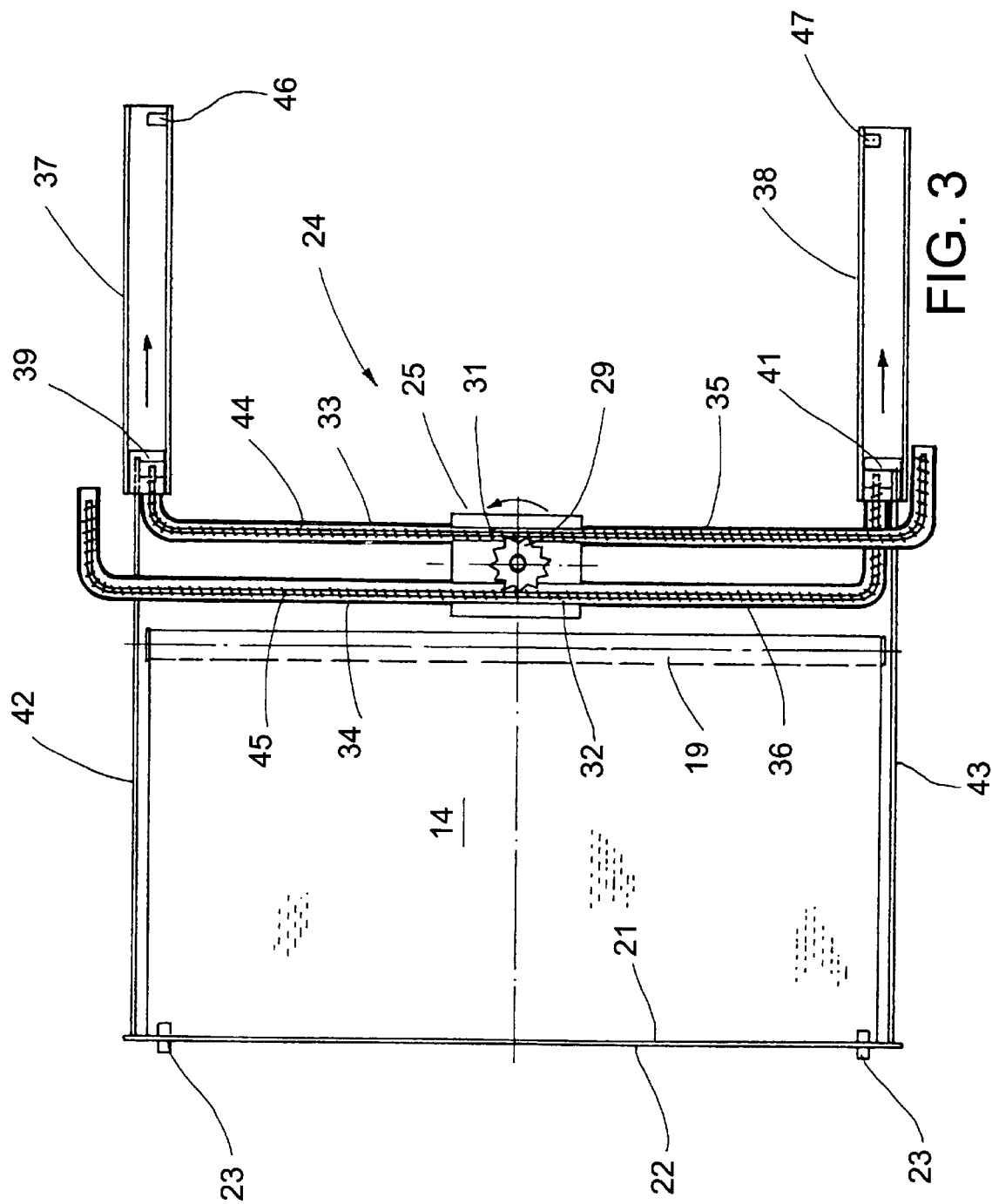
FIG. 3 is a top plan view of the window shade shown in FIG. 2.

Two guide conduits 31, 32, as depicted in FIG. 3, extend through the gear housing 27 at diametrically opposite sides tangentially with respect to the gear wheel 29. Rigid guide sleeves 33, 34, 35 and 36 have ends fixedly connected to the gear housing 27 in aligned relation with the guide conduits 31, 32.

The guide sleeve 33 leads to a guide tube 37, which starts a short distance from the window shade slit 15 and is oriented essentially parallel to the longitudinal direction of the vehicle. The guide tube 37 is mounted in the roof interior space 6. The guide sleeve 36 connects the gear housing 27 with a guide tube 38, which also starts at a short distance from the window shade slit 15 and is fastened in the roof interior space parallel to the longitudinal direction of the vehicle. Respective guide carriages 39, 41 are guided for the linear displacement in the two guide tubes 37, 38.

The guide carriage 39 is connected to an end of the stiffening rod 22 by means of a spring-like bendable, comparatively stiff wire, which constitutes a guide and push rod 42. A further guide and push rod 43, also made of a spring-elastic, comparatively stiff material, connects the guide carriage 41 with the other end of the stiffening rod 22. The two guide and push rods 42 and 43 are fixedly connected in the push and pressure direction with the stiffening rod 22 and the associated carriage 39, 41.

A geared connection between the two guide carriages 39, 41 and the gear motor 25 takes place via pressure-resistant linear pushing members 44, 45. The two pushing members 44, 45 can be known SU-flex shafts™, for example, and make up a form of Bowden cable assembly with the guide sleeves 33, 36. The SU flex shaft™ consists of a core in the form of a cord of circular cross section and a wire spiral, which forms a single- or multi-thread screw on the core. The spaces between the individual adjoining windings of the wire are greater than the wire diameter, which results in helically extending teeth on the outside of the core. The SU flex shaft™ constitutes a sort of helically extending toothed rack with a flexible and pressure-resistant behavior in the guide sleeves 33–36.

The teeth of the gear wheel 29, which are represented in enlarged form in the drawing figures, are actually matched to the pitch of the linear pressure members 44, 45, and the guides in the gear housing 27 assure that the pressure members 44, 45 are kept in constant engagement with the gear wheel 29.

The pressure member 44 is connected with the carriage 39 in an extension and compression manner. From there, it leads through the guide sleeve 33 into the gear housing 27, and from here on into the guide sleeve 35, which is used as a storage tube for the respectively projecting portion of the pressure member 44. The pressure member 46 similarly is connected with the carriage 41 in an extension and compression manner, leading through the guide sleeve 36 to the gear housing 27 and from there further into the guide sleeve 34, which is also used as a storage tube.

The functioning of the described window shade is as follows:

In the retracted or rest state, the window shade web 14 is wound on the windup roller 16 by the action of the helical spring 19. In this position, the front edge 21 of the window shade web 14 can either be located in the window shade slit 15 or be pulled back behind its edge.

In the position of rest, the guide carriages 39, 41 are in a position in which the guide and push rods 42, 43 have also been retracted into the guide tubes 37, 38. The length of the guide tubes 37, 38 is of an appropriate size so that the carriages 39, 41 are guided in the respective guide tubes 37, 38 in every operational position.

The two flexible pressure members 44, 45 have been pushed forward, i.e. their free ends are located a short distance away from the drive gear wheel 29. This end position can be mechanically fixed in that detents, for example the detents 46, 47, may be fixed in the guide tubes 37, 38.

When the user wishes to extend the window shade web 14 from the position of rest of the window shade 13, he actuates an appropriate switch in the vehicle, so that the gear motor 25 is provided with current. The motor puts the output gear wheel 29 into motion, which in turn moves the two guide carriages 39, 41 in the direction toward the end adjacent to the rear window 3 because of the meshing engagement with the flexible pressure members 44, 45.

The guide and push rods 42, 43 are pushed outward through the window shade slit 15 by this movement of the two guide carriages 39, 41. In the process, they take along the front edge 21 of the window shade web 14 and move these toward the inside of the rear window pane 8. As soon as the two sliders 23 connected with the front end 21 move against the inside of the rear window pane 8, the front edge 21 is forced to move along the inside of the rear window pane 8 down from the upper roof edge 7. In the process, the spring-elastic and sufficiently stiff guide and push rods 42, 43 keep the sliders 23 pushed against the inside of the rear window pane 8 in every operational position.

As soon as the user has decided that the window shade web 14 has been extended sufficiently far for achieving satisfactory shading, the user releases the switch and the current supply for the gear motor 26 is stopped. Since the gear motor 26 is self-locking, the window shade web 14 remains in the position selected by the user even when the motor is switched off. The completely extended position is represented in FIGS. 1 to 3.

The completely extended position of the window shade web 14 can also be fixed by means of appropriate detents in the guide tubes 37, 38. These detents are located at the end adjacent to the rear window pane 8. The guide carriages 39, 41 are prevented from getting out of the guide tubes 37, 38 by means of these detents.

Use of the electric control becomes particularly simple by this arrangement because it may remain switched on sufficiently long until the carriages 39, 41 have reached the detent and further movement is blocked. To prevent an unnecessarily long switch-on of the motor current it also is possible to detect the increased motor current in case of a blockage and in such case, automatically switch it off.

The retraction of the window shade web 14 takes place when the user puts the gear motor 25 into motion in the opposite direction of turning by means of an appropriate switch. In this direction of turning, the gear wheel 29, which is interlockingly coupled with the pushing members 44, 45, pushes the pushing members 44, 45 back into the guide tubes 37, 38. The guide carriages 39, 41 in the guide tubes 37, 38 are correspondingly moved out of the position next to the rear window 3. The guide carriages 39, 41 pull the guide and push rods 42, 43 back through the window shade slit 15 into the roof interior 6, and they themselves also move into the guide tubes 37, 38. The window shade web 14 is simultaneously wound on the windup roller 16 by the action of the helical spring 19. The window shade web 14 is kept taut in cooperation with the guide and push rods 42, 43, which are held in place via the drive system 24, and the windup roller, which is maintained pre-tensed in the windup direction, in every operational position of the window shade web 14. To obtain a faultless guidance of the guide and push rods 42, 43, further guide channels can be additionally provided in the vicinity of the window shade slit 15, through which the guide and push rods 42, 43 extend.

In the exemplary embodiment described, the front or lower edge 21 of the window shade web 14 is actuated by means of the gear motor 25, while the other edge is connected with the spring drive 19. A kinematic reversal is also possible. In this case, the windup roller 16 may be driven by the gear motor 25, while a spring acts on the guide carriages 39, 41 in order to prestress these guide carriages 39, 41 in the position in which they adjoin the upper window edge 7, i.e., in which the guide and push rods 42, 43 are extended. The springs for the two guide carriages 37, 39 can be extension or compression springs.

Figure 4:
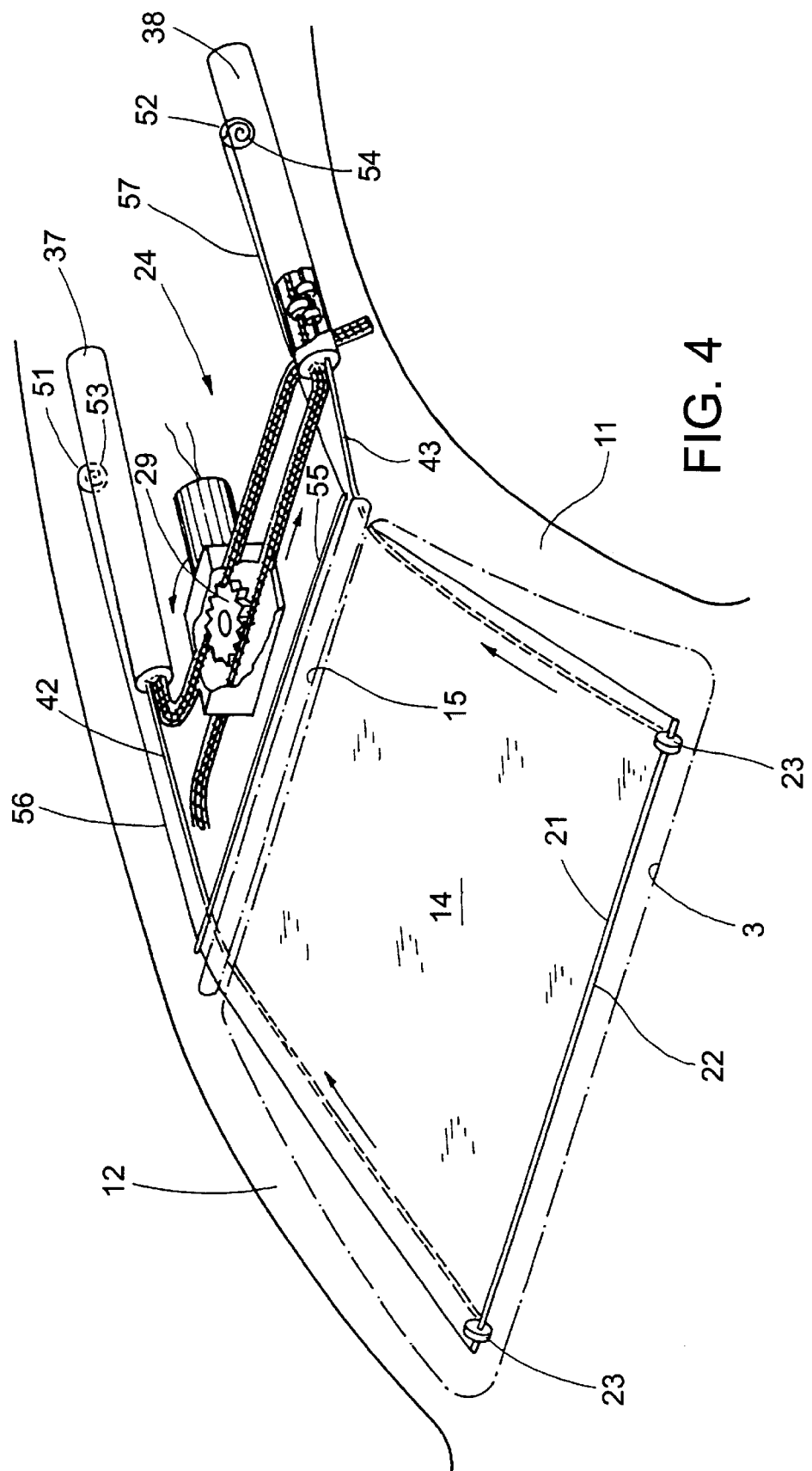
FIG. 4 is a perspective of an alternative embodiment of window shade embodying the invention.

If the body has a shape wherein the roof interior 6 is too strongly curved for receiving a windup roller 16 of sufficient width, the structure in accordance with FIG. 4 is appropriate. To the extent that structural elements and structural parts are employed in this structure, which are of the same construction or essentially have the same function as the previously described components, they need not be described again. Instead, reference is made to the above description.

In the exemplary embodiment in accordance with FIG. 4 the windup roller 16 is omitted. Two webbed belt disks 51, 52 are rotatably seated in the roof interior space 6 in place of the windup roller 16. A helical spring 53, 54 is assigned to each windup disk 51, 52, by means of which the windup disks 51, 52 are prestressed in one direction of rotation.

On its rear edge 55 which, in the previous exemplary embodiment was connected with the windup roller 16, the window shade web 14 is provided with a stiffening rod 55. Two tension belts 56, 57 act on the ends of the stiffening rod 55 and are in turn anchored on the associated windup disk 51, 52.

In the extended state, the window shade web 14 is maintained taut between the extended ends of the guide and push rods 42, 43 and the unrolled tension belts 56, 57. The tension belts 56, 57 are kept tensed with the aid of the windup disks 51, 52 and the associated helical springs 53, 54.

When being retracted, the two tension belts 56, 57 are wound on the windup disks 51, 52. But the window shade web 14 is held, completely spread, between the tension belts 56, 57 and the guide and push rods 42, 43, even in the completely retracted state, similar to that shown in FIG. 4 in connection with the extended state. Therefore, the two windup disks 51, 52 are arranged at an a appropriate distance from the window shade slit 15 so that the stiffening rod 55 does not connect with the windup disks 51, 52 when the window shade web 14 is completely retracted.

With the previous exemplary embodiments the window shade web 14 consisted of a thin foil, which can only be stressed by tension. The guide and push rods extending through the window shade slit 15 are required.

Figure 5:
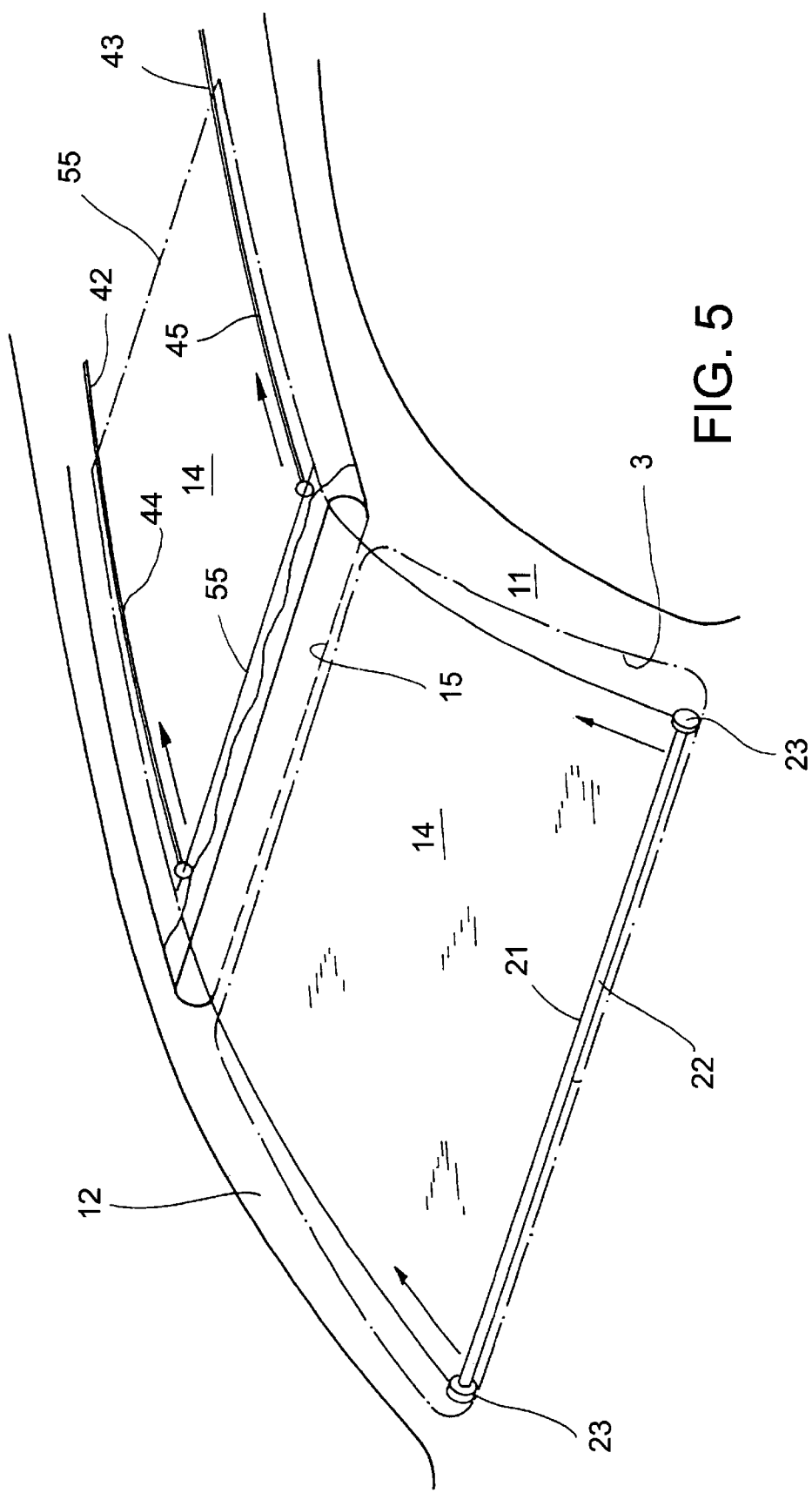
FIG. 5 is a perspective of a window shade according to the invention having a relatively stiff window shade web suitable for pushable retraction and extension.

FIG. 5 shows an embodiment wherein the window shade web 14 itself is essentially resistant to bending. In this case it is sufficient if the linear pushing members 44, 45 act directly on the rear edge 55 of the window shade web 14. The drive mechanism of the pushing members 44, 45 is essentially the same as that in the previously described exemplary embodiments.

Figure 6:
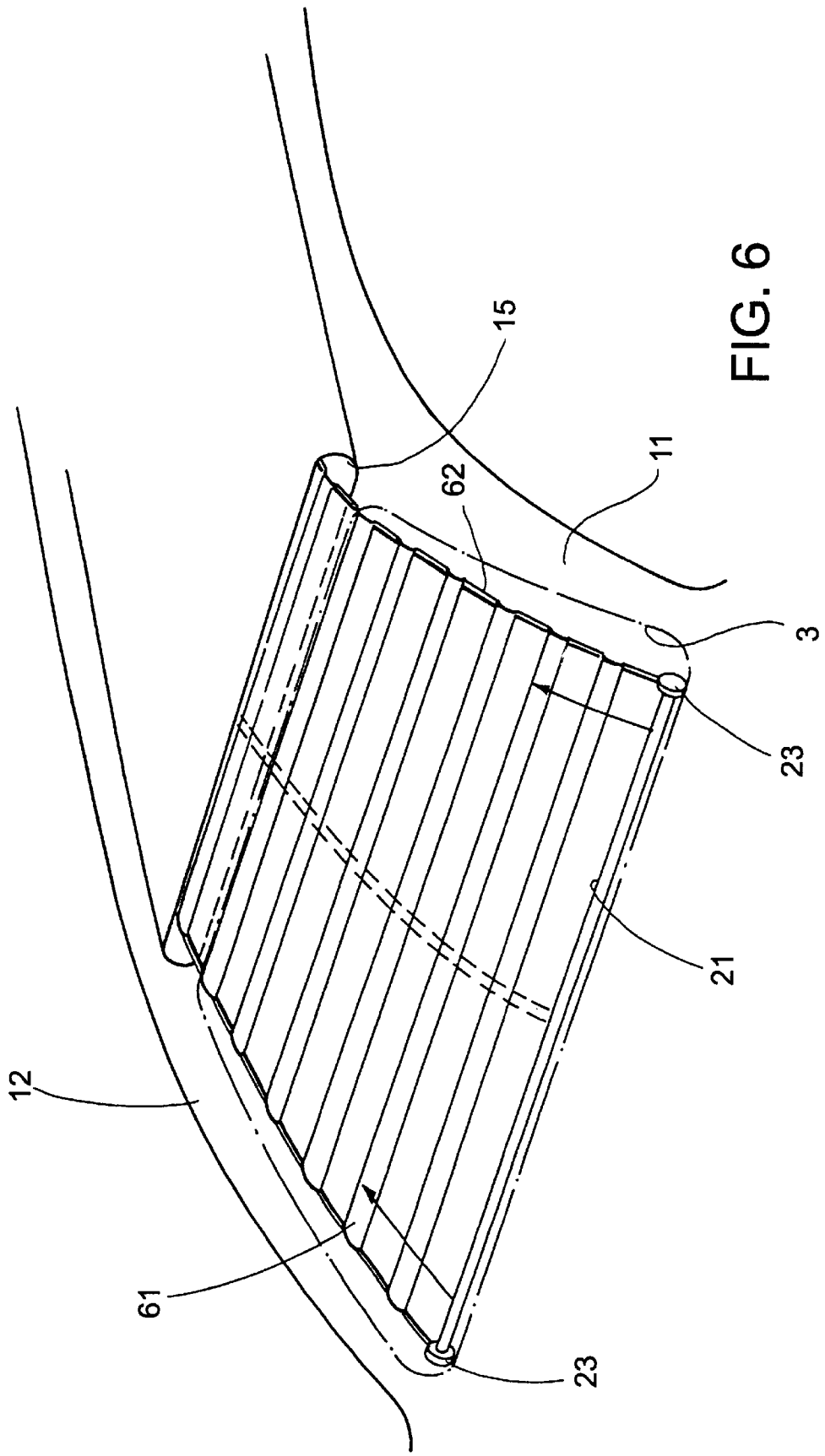
FIG. 6 is a perspective of a window shade having a web stiffened by means of bows or slats.

If there is concern that the window shade web 14 would sag when spread out, it can be provided with transversely extending bows 61 in accordance with FIG. 6, which extend parallel with the lower edge 21. In FIG. 6, the bows 61 are shown on the left, or upperhalf. Alternatively, the window shade web 14 may be used with individual slats 62, which are hooked together, similar to the slats used for shutters. These slats 62 are shown on the right side of FIG. 6.

Figure 7:
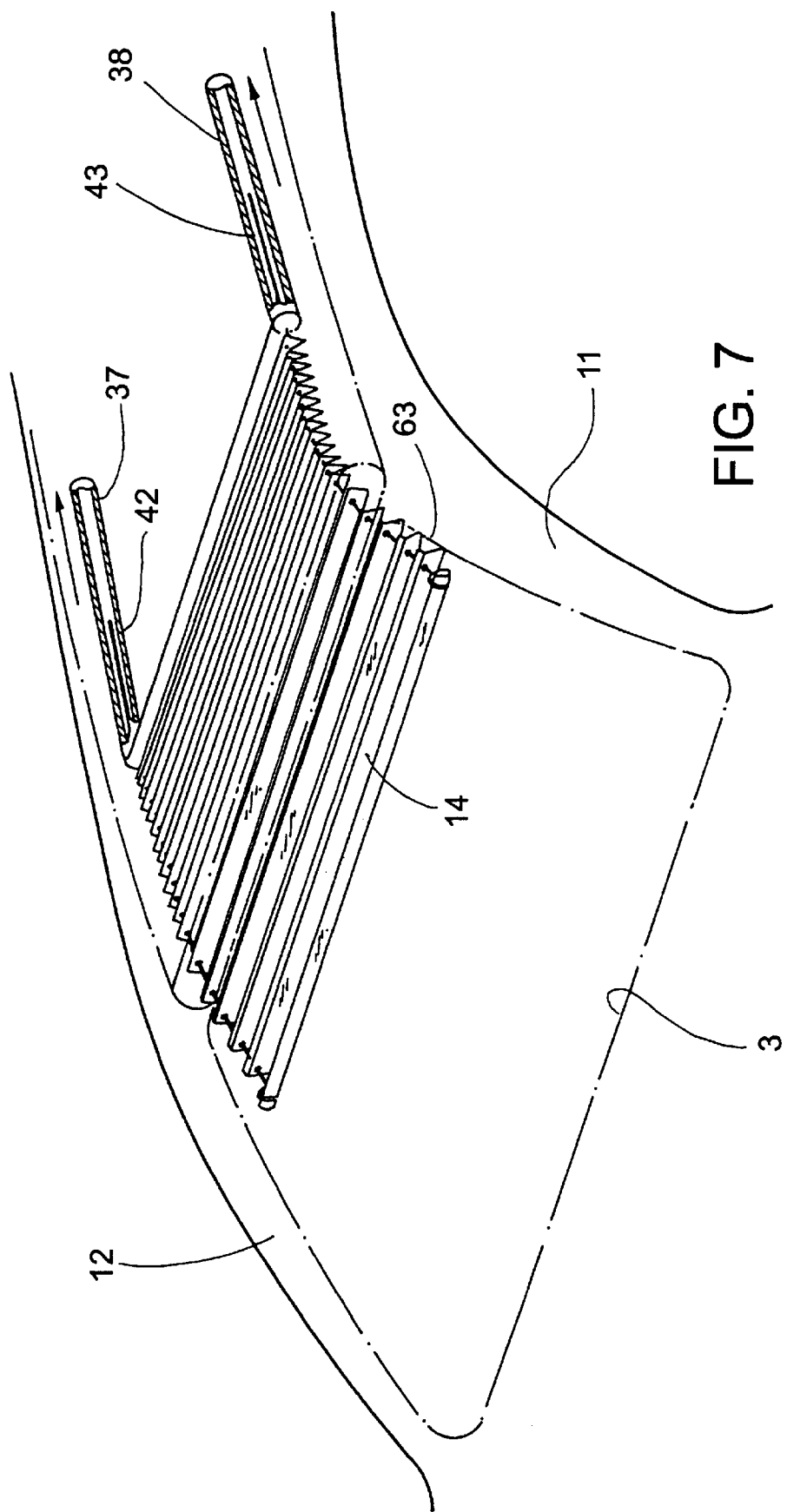
FIG. 7 is a window shade having a web that is foldable into a retracted position by means of accordion pleats.

Finally, in accordance with FIG. 7, the window shade web 14 also can be accordion-pleated. Holes are punched into the pleats, and the guide and push rods 42, 43, pass through the holes. Otherwise, the shade can be operated similarly to the prior exemplary embodiments, such as that described in connection with FIGS. 1–3.

The window shade 13 has been described above in connection with a rear window and a roof, which is rigidly and permanently connected with the body. It also can be used for rear windows of sport vehicles with hardtops, in this case the window control structure as a whole is placed into the hardtop.

Moreover, the window shade 13 in accordance with the invention also can be employed in connection with rear windows which are located in a tailgate of a station wagon. Since the window shade web 14 is maintained and held spread out by the flexible guide and push rods 42, 43, the window shade can follow the pivotal movement of the tailgate in the extended state.

Rear windows, such as used in tailgates of off-road vehicles, can also be shaded by means of the window shade in accordance with the invention. It may be desirable that the automatic retraction of the window shade web 14 is performed as soon as the door is opened.

The window shade 13 in accordance with the invention is not limited to windows wherein the roof makes a transition into the rear window at a shallow angle. The angle between the rear window and the roof also can approach a right angle. The window shade slit must only have a sufficient distance from the rear window, so that too excessive bending of the guide and push rods 42, 43 need not be required.

Aside from the variations in connection with rear windows, the window shade structure in accordance with the invention can also be employed as a replacement for sun visors at the windshield or for side windows. In this case, the side windows may be seated rigidly and fixed in the body, or are located in doors.

From the foregoing, it can be seen that a motor vehicle may be equipped with the protective sun shade 13, whose essential mechanical elements are housed in the roof interior space 6 above the headliner 5. The protective sun shade 13 is free of guide rails. Either the sun shade web 14 is sufficiently rigid, or its front edge is supported with the aid of guided guide and push rods 42, 43 in such a way that its front or lower edge 21 is held in contact with the respective pane 8. A gear motor 25 is provided for operating, i.e. retracting and extending the window shade web 14.

What is claimed is:

1. A motor vehicle comprising:
  a vehicle body having a roof which includes an exterior dimensionally stable roof skin and an interior headliner, said roof skin and headliner defining an interior roof space, at least one downwardly extending window adjoining the roof, said roof having at least one interior window shade slit communicating with the interior roof space, a flexible window shade web extending through the window shade slit and being at least partially retractable into the interior roof space, a drive system housed in the interior roof space for moving the window shade web back and forth between a retracted position and an extended position in which the window shade extends downwardly at least partially in front of an interior side of the window, said drive system including a mechanical drive for operating said drive system and moving the window shade web between said retracted and extended positions, said window shade having a stiffening rod at a leading edge that is movable with the web away from said slit during movement of said web to the extended position, said drive system including at least one bendable connecting member attached to said stiffening rod and being movable in outward relation to said slit in response to said operation of mechanical drive for pushing said stiffening rod and web toward said extended position, and said at least one connecting member being sufficiently rigid to force the stiffening rod and web to said extended position and being sufficiently flexible to bend downwardly from said roof slit during movement of said web to said extended position for biasing the web into close relation to the interior side of the window during movement to said extended position.

2. The motor vehicle of claim 1 in which said body constitutes a passenger compartment and the window is a window for the passenger compartment.

3. The motor vehicle of claim 1 in which said dimensionally stable roof is a permanent component of the vehicle.

4. The motor vehicle of claim 1 in which said headline at least in part is molded.

5. The motor vehicle of claim 1 in which said roof skin is made of sheet metal.

6. The motor vehicle of claim 1 in which said window shade slit has a length corresponding substantially to the width of the window in the area in which it adjoins the roof.

7. The motor vehicle of claim 1 in which said window shade web has a width corresponding substantially to the width of the window in the area which adjoins the roof.

8. The motor vehicle of claim 1 in which said window shade web is made of material which can be rolled up.

9. The motor vehicle of claim 1 in which said stiffening rod extends substantially the length of said edge of the web.

10. The motor vehicle of claim 1 in which said window shade web has a rectangular shape.

11. The motor vehicle of claim 1 in which said window shade web is made of a material that reduces the entry of light into an interior of the vehicle.

12. The motor vehicle of claim 1 in which said drive system includes a wind up roller rotatably mounted in said interior roof space onto which one edge of the window shade is fastened.

13. The motor vehicle of claim 12 in which said drive system includes a spring coupled to said wind up roller for urging the wind up roller in a wind up direction.

14. The motor vehicle of claim 1 in which sides of said window shade web are unsupported between forward and rearward peripheral edges when said web is in an extended position.

15. The motor vehicle of claim 1 in which said drive system includes at least one linear pushing member for exerting pushing force on said connecting member during movement of said window shade web to said extended position.

16. The motor vehicle of claim 15 in which said pushing member has at least sections that are substantially kink resistant.

17. The motor vehicle of claim 15 including at least one guide sleeve along a side of said window shade web, and said pushing member is movable and guided without kinking in said sleeve.

18. The motor vehicle of claim 15 in which said drive system includes a drive motor having a gear wheel, and said linear pushing member has teeth that are interlockingly coupled to and driven by the gear wheel.

19. The motor vehicle of claim 15 in which said drive system includes an electric gear motor coupled to the pushing member for moving the pushing member in a direction for retracting and extending said window shade web.

20. The motor vehicle of claim 1 in which said window shade web has said connecting members coupled to said stiffening rod on opposite sides thereof which are extendable out of the window shade slit with the web.

21. The motor vehicle of claim 1 in which said drive system includes at least one spring for urging said window shade web toward a retracted position.

22. The motor vehicle of claim 1 in which said mechanical drive includes an electric gear motor.

23. The motor vehicle of claim 22 in which said drive system includes a wind up roller for the window shade web, and said gear motor is coupled to and rotatably drives said wind up motor.

24. A motor vehicle comprising:
a vehicle body having a roof which includes an exterior dimensionally stable roof skin and an interior headliner, said roof skin and headliner defining an interior roof space, at least one downwardly extending window adjoining the roof, said roof having at least one interior window shade slit communicating with the interior roof space, a flexible window shade web extending through the window shade slit and being at least partially retractable into the interior roof space, a drive system housed in the interior roof space for moving the window shade web back and forth between a retracted position and an extended position in which the window shade extends downwardly at least partially in front of an interior side of the window, said window shade having a stiffening rod at a leading edge that is movable with the web away from said slit during movement of the web to said extended position, said drive system including at least one drivable connecting member attached to said stiffening rod and being movable with said stiffening rod during movement of said web between extended and retracted positions, and said at least one connecting member being sufficiently rigid to absorb axial forces between said stiffening rod and connecting member during movement of said web while being sufficiently flexible to bend downwardly from said roof slot during web movement for biasing the web into close relation to an interior side of said window during movement.

25. The motor vehicle of claim 24 including a pair of said connecting members each coupled to a respective end of said stiffening rod.

26. The motor vehicle of claim 25 in which said connecting members are flexible rods.

27. The motor vehicle of claim 26 including a pair of linear pushing members each for exerting a pushing force on a respective one of the connecting members during movement of said web.

28. The motor vehicle of claim 26 in which said flexible rods each have a respective roller at a terminal end disposed outwardly of the window shade slit.

29. The motor vehicle of claim 27 including a pair of guide sleeves, said pushing members being movable and guided within said guide sleeves without kinking.

30. The motor vehicle of claim 29 in which said drive system includes a mechanical drive for positively moving said pushing members, which in turn move said connecting members, stiffening rod, and web.

* * * * *